(12) United States Patent
Smith (10) Patent No.: US 6,824,156 B2
(45) Date of Patent: Nov. 30, 2004

(54) ADJUSTABLE HITCH ASSEMBLY

(76) Inventor: Jerry R. Smith, 5690 W. Rowland Ave., Littleton, CO (US) 80128

(*) Notice: Subject to any disclaimer, the term of this patent is extended or adjusted under 35 U.S.C. 154(b) by 13 days.

(21) Appl. No.: 10/286,032

(22) Filed: Oct. 31, 2002

(65) Prior Publication Data

US 2004/0084877 A1 May 6, 2004

(51) Int. Cl.[7] .................................................. B60D 1/46
(52) U.S. Cl. ..................................................... 280/490.1
(58) Field of Search .............................. 280/400, 479.1, 280/477, 478.1, 490.1, 497, 504, 511

(56) References Cited

U.S. PATENT DOCUMENTS

| | | | | |
|---|---|---|---|---|
| 2,328,343 A | * | 8/1943 | Jacob | ..................... 280/490.1 |
| 3,035,856 A | | 5/1962 | Mleczko et al. | |
| 3,236,541 A | * | 2/1966 | Poteet | ..................... 280/490.1 |
| 3,554,578 A | | 1/1971 | Reed | |
| 3,708,183 A | | 1/1973 | Jones | |
| 3,865,406 A | | 2/1975 | Dutton | |
| 4,103,928 A | | 8/1978 | Sheppard, Jr. | |
| 4,111,449 A | * | 9/1978 | Hancock | ..................... 280/402 |
| 4,148,498 A | * | 4/1979 | Taylor, Jr. | ..................... 280/482 |
| 4,266,799 A | * | 5/1981 | Wood | ..................... 280/490.1 |
| 6,585,280 B1 | * | 7/2003 | Wiers | ..................... 280/468 |
| 6,663,133 B1 | * | 12/2003 | Rosenlund | ..................... 280/490.1 |

* cited by examiner

*Primary Examiner*—Lesley D. Morris
*Assistant Examiner*—Matthew Luby
(74) *Attorney, Agent, or Firm*—Timothy J. Martin; Michael R. Henson; Rebecca A. Gegick (57) ABSTRACT

A hitch assembly adapted to secure a trailer and tractor vehicle includes an elongated housing, a threaded shaft in the housing, a coupling member on the shaft, a carriage member secured to the coupling member, a rotatable drive that turns the shaft to advance the coupling member and carriage member, a first member secured to the housing for connection to one of the vehicles and a second member secured to the carriage for connection to the other vehicle. This allows the effective height of the hitch assembly to be varied so that different towing situations can be accommodated. In one embodiment, flat slide surfaces between the carriage and the housing are provided. A yoke assembly is also disclosed.

39 Claims, 7 Drawing Sheets

ADJUSTABLE HITCH ASSEMBLY

FIELD OF THE INVENTION

The present invention generally relates to trailer hitches of the type commonly used to connect a tractor vehicle to a trailer vehicle and, more particularly, to a hitch assembly providing a means for easily adjusting the position of the ball hitch with respect to the hitch receiver for simplified connection, removal, and towing.

BACKGROUND OF THE INVENTION

Trailer hitches are devices that connect a tractor vehicle (also called a tow vehicle) to a trailer vehicle by means of a ball hitch which is mounted onto the vehicle, or onto a tow bar which is connected to the vehicle. The hitch ball then mates with a socket located on the trailer tongue. This ball and socket configuration is designed to allow adequate rotation of the socket with respect to the ball so that the vehicle-trailer combination can maneuver around corners. Typically the socket mechanism has a releasably lockable coupling so that it locks onto the ball hitch to prevent decoupling while towing.

Oftentimes the hitch assembly is removable from the vehicle when it is not in use in order to prevent both exposure to the elements and damage to the tow vehicle (or other vehicles) because the operator can easily forget about the protruding presence of the draw bar when a trailer is not being towed. These assemblies usually have a ball hitch which is mounted onto a drawbar which is, in turn, connected to a hitch bar. The hitch bar mates with a hitch receiver which is mounted onto the bumper or another structurally-sound member of the tow vehicle. The hitch bar is designed to be removable from the hitch receiver for times when the vehicle is not towing a trailer.

A common problem with hitches is that the vehicle and the trailer are not often naturally in a convenient vertical position with respect to one another to make their connection, or removal, an easy task. The tow bar of the trailer may be resting below the vertical plane of the hitch ball so that the trailer must first be jacked up to allow the hitch ball to be positioned underneath the tow bar. Many tow bars come fitted with integral jacks to accomplish this. However, if one forgets to raise the jack out of the way before driving, the jack, and possibly the trailer or tow vehicle, can be damaged. Another problem, and one that the integral jack does not address, is that the height of the hitch ball may not be correct for the existing load distribution in the trailer, making the towing operation unsafe or causing excessive wear on the tires. Some hitches have no means of adjusting the vertical position of the hitch ball while other mechanisms are very time consuming to adjust because they require changing the hitch bar which can only be done while the trailer is not connected to the vehicle.

With the purpose of overcoming these problems, several types of adjustable hitches, which present schemes for simplifying the adjustment of the hitch ball relative to the hitch receiver, have been invented. For example, U.S. Pat. No. 3,035,856 issued May 22, 1962 to Mleczko and Grimh shows a load leveler adjustable trailer hitch bar which is constructed to attach to the tow bar of the trailer and allow adjustment of the vertical position of the trailer tongue by rotating a lever on the top of the device. This turns a threaded screw which causes the trailer tongue to move up or down depending on the direction of rotation. The device requires some modification be made to a conventional trailer tongue for it to be installed and functional.

U.S. Pat. No. 3,554,578 issued Jan. 12, 1971 to Reed shows an adjustable trailer hitch which is connected to the rear of a tow vehicle and which allows for vertical adjustment of the hitch ball position by rotating a screw with a motor. The portion of the device including the hitch ball is supported by a pair of guide rods which transfer the trailer loads to the tow vehicle. This device requires that the vehicle be modified or that a mounting plate be installed onto the vehicle for attachment of the hitch. Furthermore, failure of the motor or the electrical power supply would render the device inoperative.

U.S. Pat. No. 4,103,928 issued Aug. 1, 1978 to Sheppard describes an adjustable trailer hitch with interchangeable connecting means. The invention is mounted onto the tow vehicle by way of bolting to a bumper or fastening onto a rear vertical surface. The height of the hitch ball is adjustable, again by means of a rotating screw drive. The device also includes a hitch ball with a locking pin which allows for replacement of the hitch ball without the need for a wrench or other tool. In this invention, the hitch ball and draw bar are attached to a plate which rides in grooves positioned in the portion which is fastened to the bumper.

While the above-described structures teach the use of adjustable hitches for towing applications, there remains a need for improved adjustable hitch assemblies. This need manifests in both the need for simplified structures as well as structures that can be manufactured efficiently at a reduced cost. The present invention is directed to providing an improved construction for adjustable hitch systems.

SUMMARY OF THE INVENTION

It is the object of the present invention to provide for a new and useful hitch assembly where the relative height of the draw bar with respect to the hitch bar is easily adjustable.

It is another object of the present invention to provide a new and useful adjustable hitch assembly which mates with standard hitch receivers and hitch balls such that the relative height of the hitch ball may be varied during use.

A further object of the present invention is to provide an adjustable hitch assembly that is easy to manufacture yet which is durable in use.

Still a further object of the present invention is to provide an adjustable hitch assembly that is constructed in such manner as to give enhanced strength and stability during a towing operation.

Yet another object of the present invention is to provide a compact adjustable hitch assembly that has an increased range of height adjustment by its ability to be mounted in alternative orientations.

According to the present invention, then, an adjustable hitch assembly is provided. The adjustable hitch assembly generally includes an elongated housing having an elongated interior with a threaded shaft, such as a worm gear, extending longitudinally within the interior of the housing. A coupling member is threadably received on the shaft for longitudinal movement when the shaft is rotated. At least one end of the shaft is connected to a drive element which resides outside of the housing and which can be used to turn the shaft. The assembly also includes a carriage member, located exteriorly of the housing, with the carriage member being secured to the coupling member for movement therewith. The assembly includes a first member that is affixed to the housing and which is adapted to connect to one of the trailer or tractor vehicles. The assembly also includes a second member that is affixed to the carriage member and which is adapted to connect to the other of the trailer or tractor vehicles.

In one embodiment, the carriage member is secured to the coupling member at at least two laterally spaced locations. The housing may include a flat exterior surface with a pair of longitudinal slots such that the carriage member is connected to the coupling member with fasteners passing through the slots. The carriage member may also include a flat slide portion that confronts the slide face for sliding movement during the advancement of the coupling member along the shaft. The carriage member may also be configured as a yoke with arm portions which confront flat slide surfaces on the housing for advancement along the shaft. The housing may include slots along opposite sides through which the yoke is connected to the coupling member with fasteners. The housing has a surrounding side wall where its interior cross-section may be of a selected shape such that the coupling member has a close-fitting engagement with it during the coupling member's advancement along the shaft.

The second member may be affixed to the carriage member at an offset location relative to the center of the longitudinal dimension of the carriage member. The first member may be a hitch bar and the second member may be a draw bar or, conversely, the first member may be a draw bar and the second member may be a hitch bar. The hitch bar may be obliquely oriented with respect to the housing. The hitch bar is configured to mate with a hitch receiver and the draw bar may be configured to include a hitch ball.

The invention may also include structures as described above in combination with a hitch receiver. A hitch ball may also be provided with the hitch ball being releasably securable to the draw bar.

These and other objects of the present invention will become more readily appreciated and understood from a consideration of the following detailed description of the exemplary embodiments of the present invention when taken together with the accompanying drawings, in which:

DETAILED DESCRIPTION OF THE EXEMPLARY EMBODIMENTS

The present invention is directed to an adjustable hitch assembly that allows for ready adjustment of the relative height difference between the hitch receiver so that the tractor vehicle and trailer vehicle can be easily coupled and so that the proper height relationship can be set for safe towing.

According to the present invention, the adjustable hitch assembly broadly includes a threaded shaft mounted inside a housing, the housing is configured to attach to one of the hitch bar and the draw bar. A coupling member threadably receives the threaded shaft and is configured to move along the axis of the shaft when it is rotated. The coupling member may also be configured to have a close fit within the housing such that it prevents the rotation of the coupling member with the shaft rotation and facilitates this axial movement. The ends of the shaft mate to a rotatable drive element which is adapted to accept a tool and which rotates the shaft for obtaining a desired position of the coupling member.

The assembly also includes a carriage member which may preferably be secured to the coupling member in at least two locations and is also secured to one of the hitch bar and the draw bar. The carriage member is positioned along the axis of the housing by the selected rotation of the shaft. The housing may possess multiple slots through which the carriage member is attached to the coupling member and may also include at least one flat face surface upon which a surface on the carriage member slides when the assembly is adjusted. The carriage member and housing are configured such that the longitudinal axis of the housing may be oppositely reversed, i.e. inverted, and thereby extend the range of adjustment positions. The connection of one of the hitch bar and the draw bar to the carriage member may also be at an offset relative to the longitudinal dimension of the carriage member to provide for a wide range of positioning by the adjustment.

Figure 1:
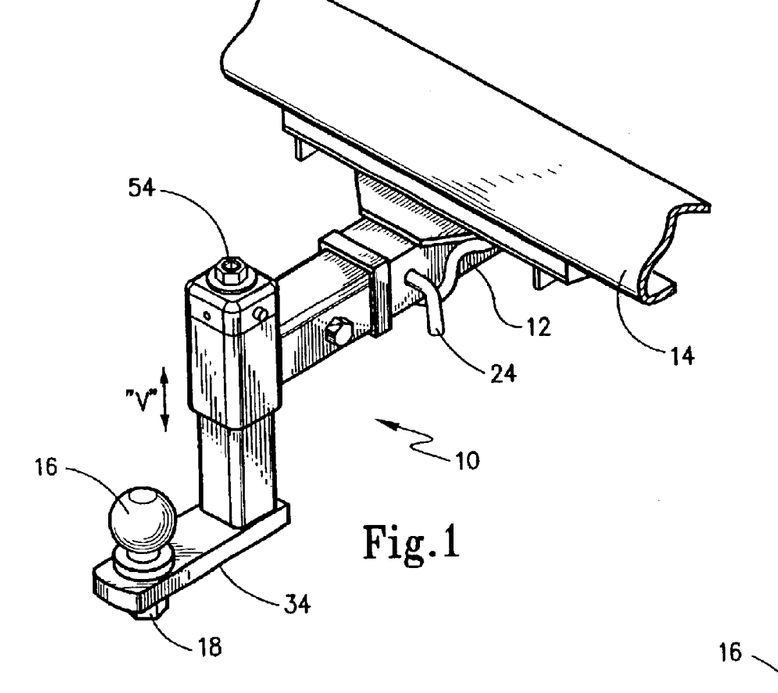
FIG. 1 is a perspective view of a first embodiment of the present invention attached to the bumper or frame of a tractor vehicle.

To further describe this invention, reference is first made to FIG. 1 which shows a perspective view of one embodiment of the invention as attached to a vehicle and with a mounted hitch ball. The adjustable hitch assembly 10 mounts onto a hitch receiver 12, which is attached to the vehicle's frame or bumper 14. The assembly 10 is held in position on the receiver 12 by a hitch pin 24. A draw bar 34 is a part of the assembly 10 and a hitch ball 16 is affixed to the draw bar 34 by a hitch ball nut 18. The direction vector, "V", indicates the principal reciprocal direction of adjustment, accomplished when a drive nut 54 is rotated, either manually with a tool or by a motor. In this manner the relative distance between the hitch ball 16 and the hitch receiver 12, along the "V" direction, can be selectively changed to simplify the coupling of a tractor and trailer and to set the proper position for towing.

Figure 2A:
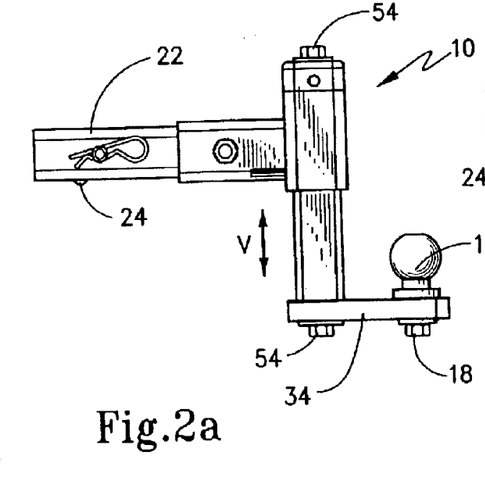
FIG. 2(a) is a side view in elevation of an adjustable hitch assembly shown in FIG. 1 and with the hitch assembly mounted in a first orientation and adjusted such that the draw bar is in the lowest position.
Figure 2B:
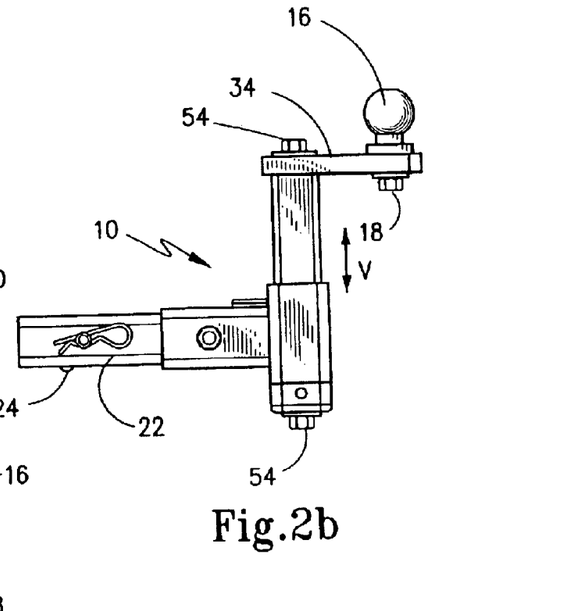
FIG. 2(b) is a side view in elevation of an adjustable hitch assembly shown in FIG. 1 with the hitch assembly mounted in a second orientation and adjusted such that the draw bar is in the highest position.

The range of adjustment positions possible are demonstrated in FIGS. 2(a) and 2(b). Both figures show a side view in elevation of the first embodiment of the assembly 10, including a hitch bar 22 which fits within the hitch receiver 12. FIG. 2(a) shows a first orientation wherein the hitch ball 16 is mounted onto the surface of the draw bar 34 that is closest to the hitch bar 22 (the same as shown in FIG. 1) and assembly 10 is adjusted such that the hitch ball 16 will be at its lowest position with respect to the hitch bar 22. FIG. 2(b) shows a second orientation for the assembly 10. Here it has been rotated 180 degrees about the longitudinal axis of the hitch bar 22 and the hitch ball 16 has been mounted onto the opposite surface of the draw bar 34 that it had been mounted to in FIG. 2(a). As can be seen, when in this orientation, the hitch ball 16 is in its highest position with respect to the hitch bar 22. Adjustment in the direction "V" can still be made in each orientation.

Figure 3A:
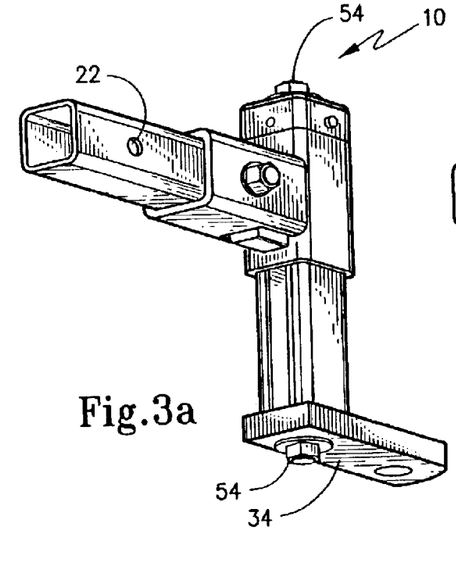
FIG. 3(a) is a perspective view of the adjustable hitch assembly of FIG. 1, adjusted such that the draw bar is positioned farthest from the hitch bar.
Figure 3B:
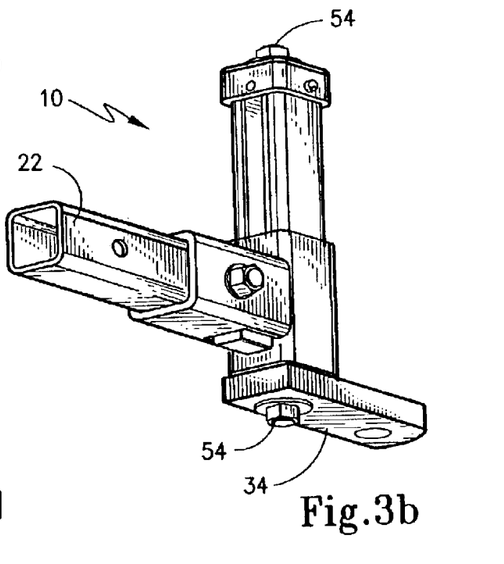
FIG. 3(b) is a view similar to FIG. 3(a) except the assembly is adjusted such that the draw bar is positioned closest to the hitch bar.

The range of movement, when in the first orientation, is discernible from FIGS. 3(a) and (b). These are again perspective view's of the first embodiment, where FIG. 3(a) shows the assembly 10 adjusted such that the draw bar 34 is furthest from the hitch bar 22 and FIG. 3(b) shows the assembly now fully adjusted in the opposite direction such that the draw bar 34 is closest to the hitch bar 22. This range of motion, the difference in the draw bar positions of FIGS. 3(a) and 3(b), can be selected by the choice of the dimensions of the various parts which make up the assembly 10 and which will be discussed later. Similarly, the complete range of possible positions including the reversal of the hitch bar 22 mating with the hitch receiver 12, or the difference in the draw bar 34 positions in FIGS. 2(a) and 2(b), is selectable by the selection of the components' dimensions.

Figure 4:
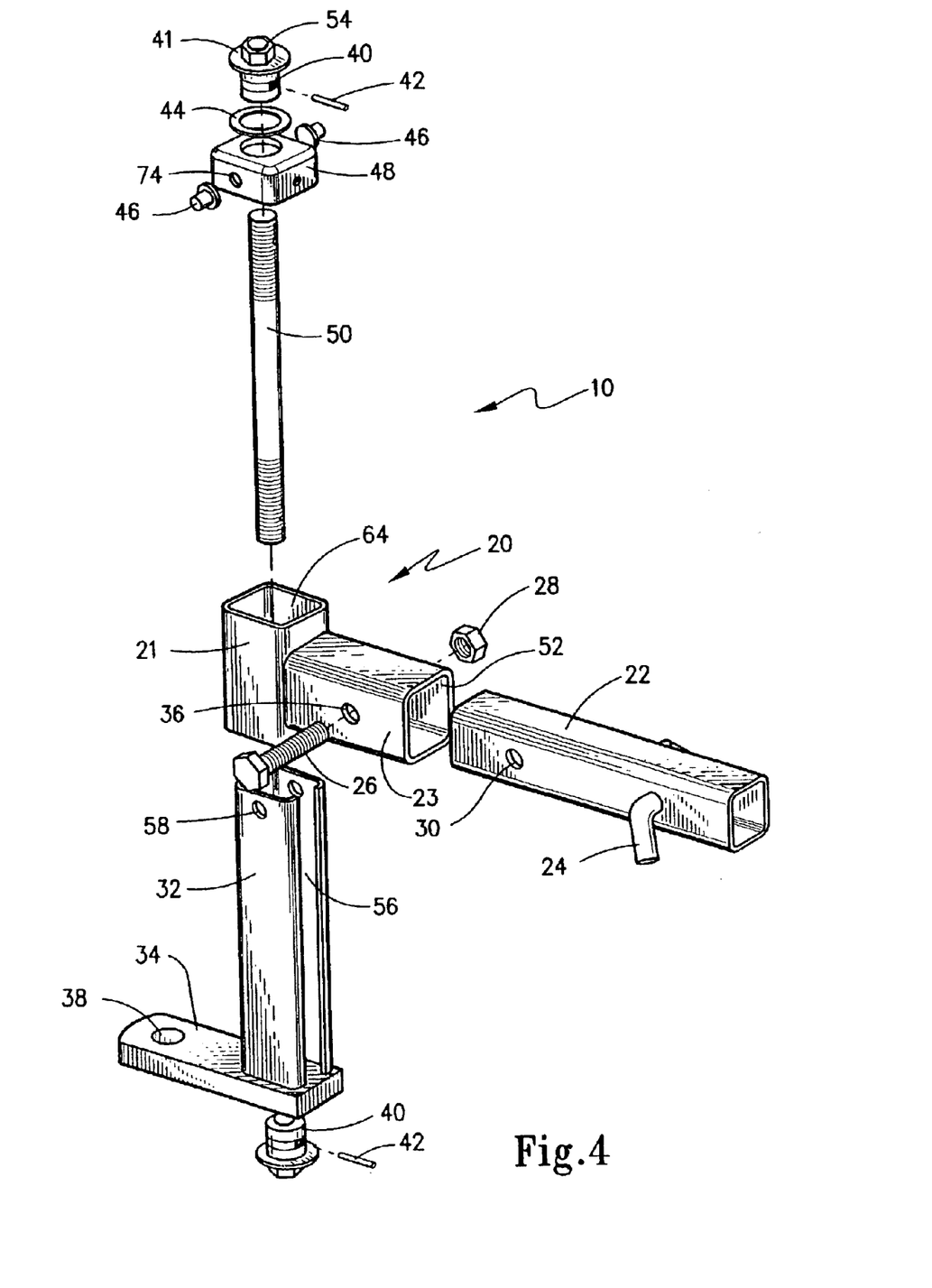
FIG. 4 is an exploded perspective view of the adjustable hitch assembly according to the first embodiment of the present invention.

To provide a more complete description of the invention. FIG. 4 shows an exploded, perspective view of the adjustable hitch assembly 10. The assembly 10 includes a carriage assembly 20 which is selectively positionable on an elongated housing 32. The carriage assembly is formed of two square, tubular sections 21 and 23 whose longitudinal axes are generally perpendicular. The tubular section 21 forms a sleeve having an interior surface 64 against which the elongated housing 32 slides. Tubular section 21 has an interior region 52 within which a hitch bar 22 fits. The dimensions of the elongated housing 32 and the carriage assembly 20 are selected to provide a close fit of the elongated housing 32 within the interior of the carriage assembly 20 defined by the interior surfaces 64. The hitch bar 22 is affixed to the carriage member 20 by inserting the hitch bar 22, aligning carriage holes 36, located in the carriage assembly, with holes 30 in the hitch bar and securing with a bolt 26 and nut 28.

The housing 32 has a sectional profile which is U-shaped and has an interior region 56. A threaded shaft 50 resides inside the housing 32, with its longitudinal axis generally parallel to or coextensive with the axis of the elongated housing 32. The threaded rod 50 is held inside the housing 32 by means of rotatable drive assembly 40 mounted onto each end of the threaded shaft 50 via a press-fit pin 42. An end cap 48 is affixed to one end of the elongated housing 32 and it is configured to receive a rotatable drive element 40, a washer 44, and button pins 46. A pair of button pin holes 58 are located in the end of the housing 32 to which the end cap 48 is mounted. The outer end of the rotatable drive element 40 has a drive element in the form of nut 54 affixed to it, this drive nut 54 is configured to mate with a wrench or tool for rotation.

A draw bar 34 is affixed to the end of the elongated housing 32 which is opposite to the end cap 48. The draw bar 34 is configured to receive another rotatable drive 40 for securing the threaded shaft 50 and also has a hitch ball mounting hole 38 for receiving standard types of hitch balls in either of the two ways shown in FIGS. 2(a) and (b).

Figure 5:
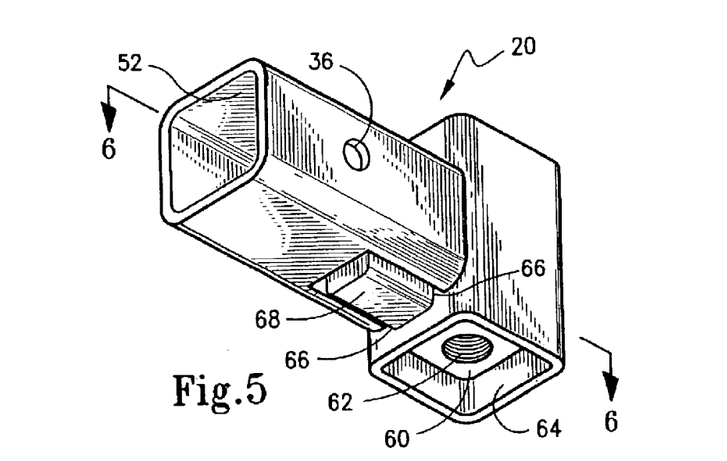
FIG. 5 is a perspective view of the carriage member of FIG. 4 with the coupling member located within.
Figure 6:
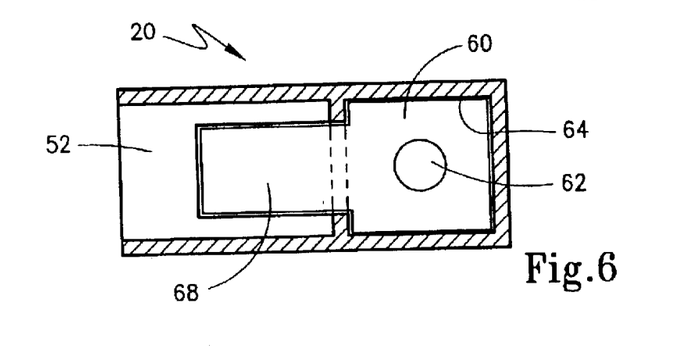
FIG. 6 is a sectional top view of the carriage and coupling member shown in FIG. 5 taken about lines 6—6 of FIG. 5.

Another view of the carriage assembly 20 is shown in FIG. 5, which is a perspective figure looking at the underside thereof. The carriage assembly 20 receives a coupling member 60 which contains a threaded bore 62 that is sized to mate with the threaded shaft 50. Rotating the shaft 50 will cause the coupling member 60 to move along the shaft. The coupling member 60 is a generally rectangular piece which closely fits within the interior of the elongated housing 56 and which also has a mounting arm 68 which extends through a hole in the wall of the carriage assembly 20 and partially into the interior region 52 of the assembly 20. In this embodiment, the coupling member 60 is rigidly fixed to the carriage assembly 20 by welds along the two longitudinal edges 66 of the outer surface of the carriage assembly 20. A sectional view of these components, indicated on FIG. 5, is shown in FIG. 6. The dimensions of the coupling member 60 and the carriage assembly 20 are selected such that the cross-sectional shape of the elongated housing will closely fit in the gap between the outer walls of the coupling member 60 and the interior surface 64 of the assembly 20.

Figure 7:
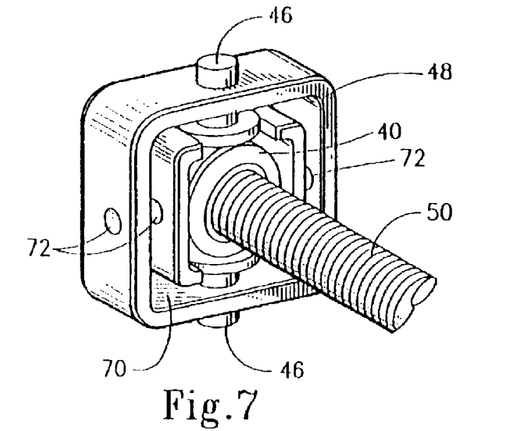
FIG. 7 is a perspective view of a portion of the threaded shaft, the end cap and the rotatable drive element of FIG. 4.
Figure 8:
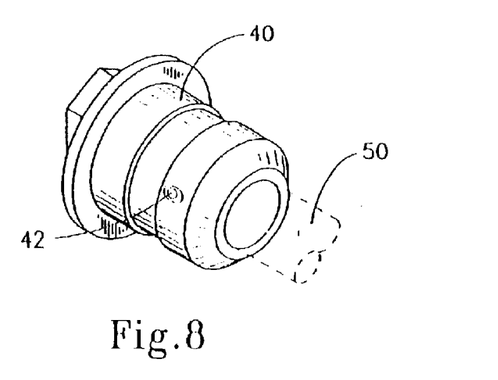
FIG. 8 is a perspective view of the rotatable drive element of FIG. 7.

A detailed perspective view of the end cap 48 and associated threaded shaft 50 portion is shown in FIG. 7. The end cap 48 is a generally rectangular shaped prism with a recess 70 shaped to receive a portion of the end of the elongated housing 32 for connection of the two pieces. Referring to FIG. 4, the end cap 48 also contains a hole within which the rotatable drive 40 resides. The drive 40 is held onto the threaded shaft 50 by a press-fit pin 42 which is inserted into a hole in the drive 40 and the threaded shaft 50 through any one of two end cap holes 72 in the end cap 48. FIG. 8 shows a perspective view of the drive element 40 and the pin 42 with a phantom portion of the threaded shaft 50.

The adjustable hitch assembly 10 also includes a pair of button pins 46 which are generally cylindrical-shaped pieces with a button end of a larger diameter. The button pins 46 provide a tight, friction fit for the rotatable drive 40 when installed in the end cap 48 and serve to prevent the shaft 50 from rotating out of position due to the normal vibrations of driving. This can be best seen in FIG. 7. The button pins 46 may be made of a flexible, yet resilient, material which can provide a frictional fit without causing undue wear to the mating materials from the rotation of the drive element 40. The end cap 48 contains end cap pin holes 74 through which the button pins 46 extend.

As seen in FIG. 4, the elongated housing 32 also contains a pair of button pin holes 58 which align with the end cap pin holes 74, upon assembly of the elongated housing 32 and the end cap 48, and through which the button pins 46 extend when they are inserted into the aforementioned two pieces. In this manner, the button pins 46 fasten the end cap 48 and housing 32 together as well as provide a friction fit for the drive element 40.

Looking at FIG. 4 it can be seen that the drive 40 contains an annular shoulder portion 41 opposite of the threaded shaft, which rests against the outer surface of the end cap 48 with a washer 44 placed between the two pieces. The end of the rotatable drive element 40 which is opposite to the threaded shaft connection is formed into a drive nut 54 purpose of mating with a wrench or other tool to be used for rotating the drive element 40.

Figure 9:
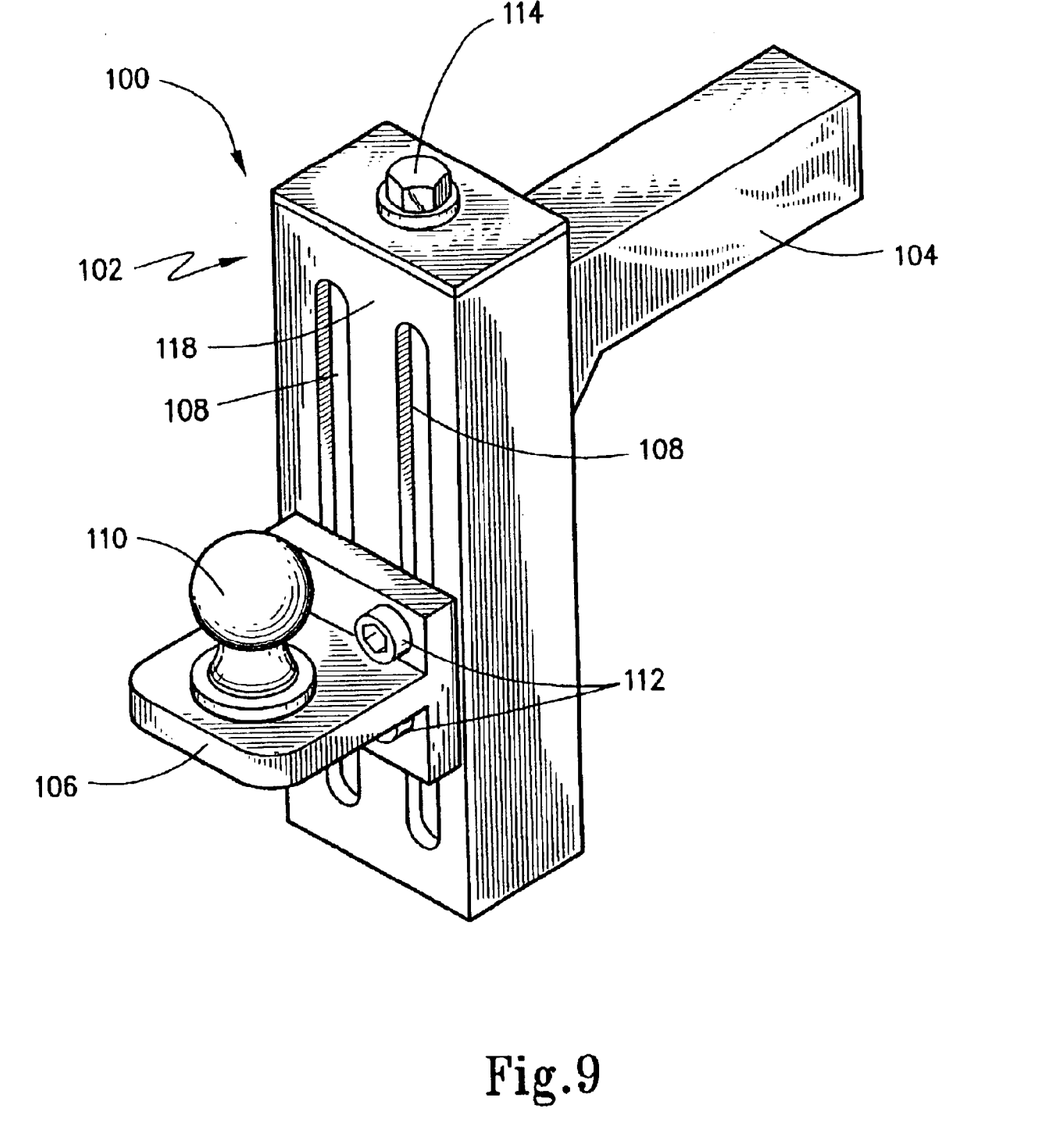
FIG. 9 is a perspective view of a second embodiment of the invention.
Figure 10:
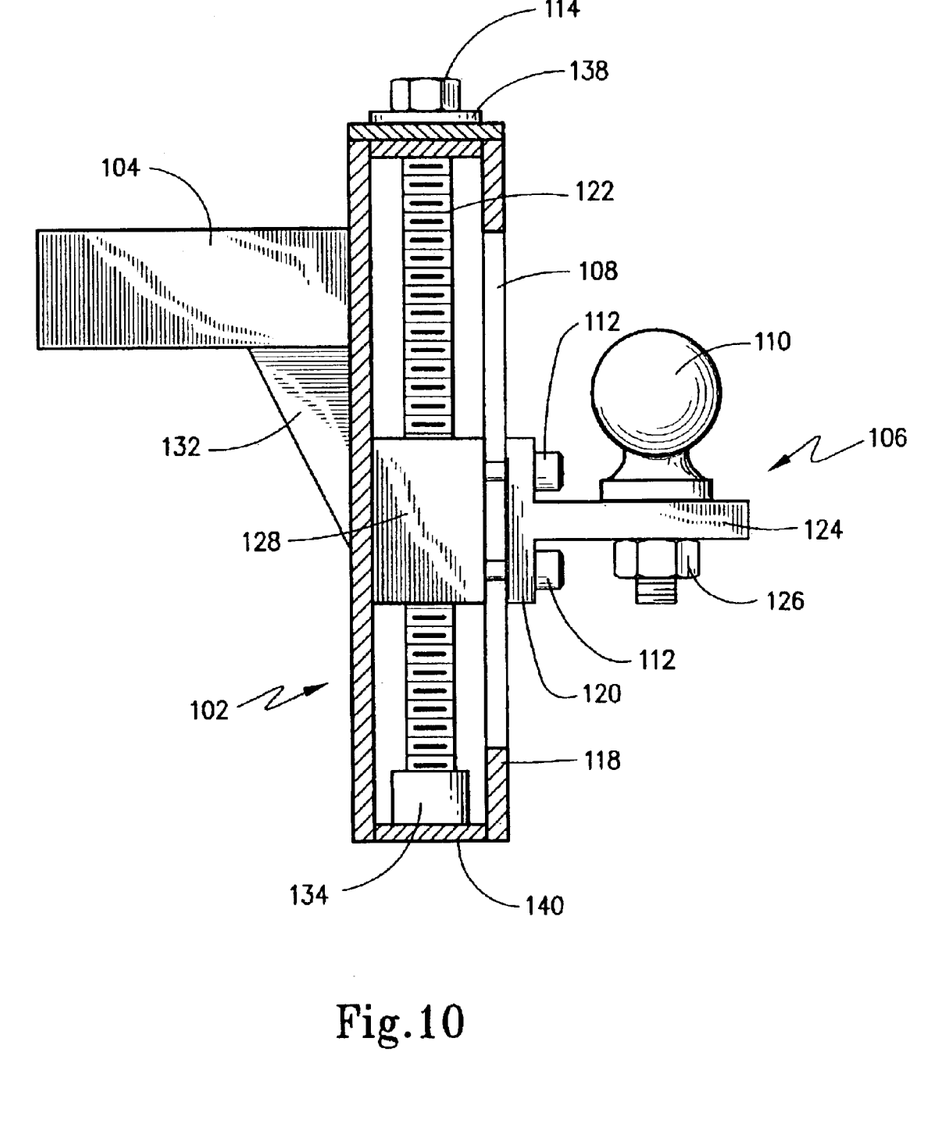
FIG. 10 is a side view, in section, of the adjustable hitch assembly shown in FIG. 9.
Figure 11:
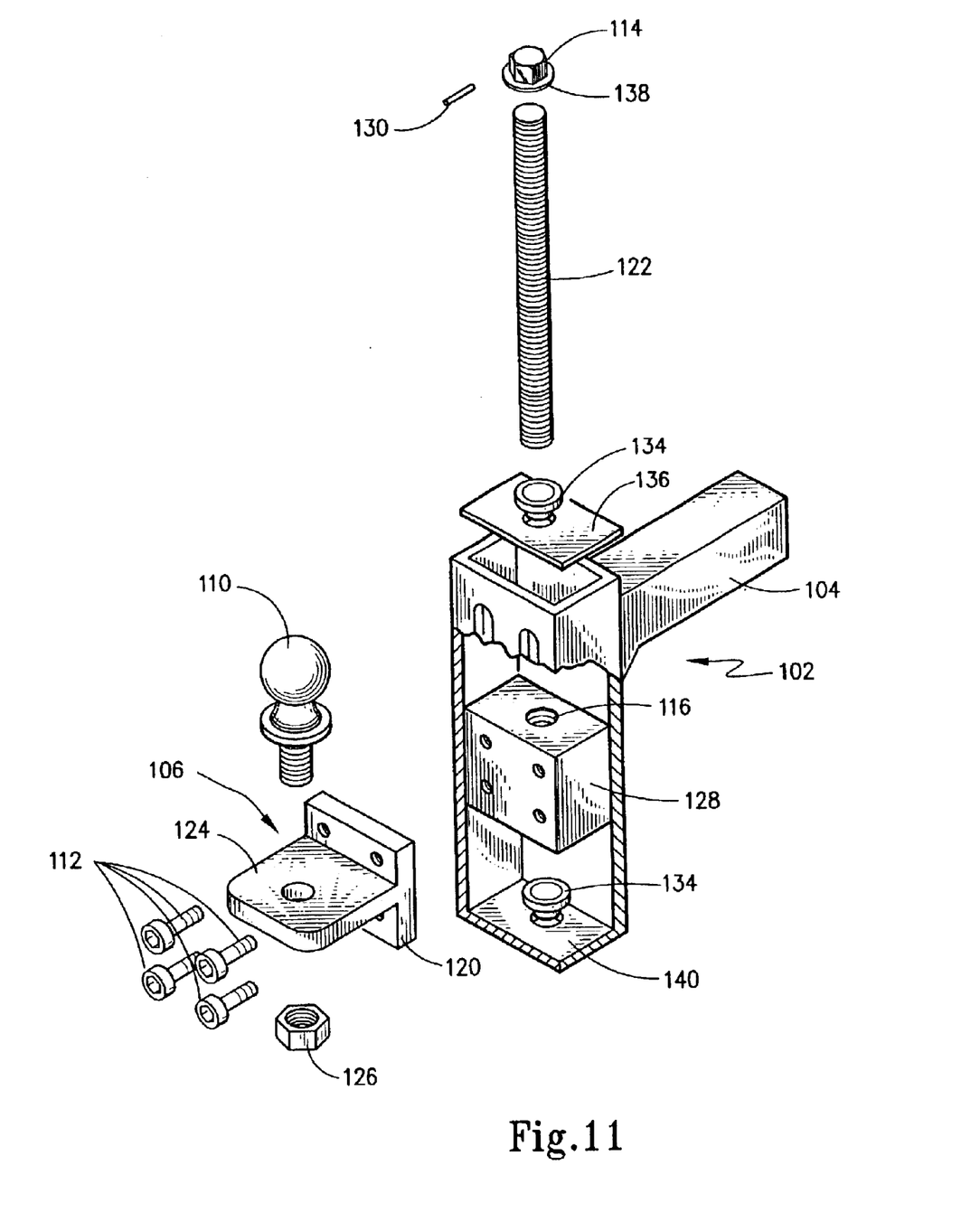
FIG. 11 is an exploded, perspective view, partially broken away, of the embodiment of the invention as shown in FIGS. 9 and 10.

Another embodiment of the invention is shown in FIG. 9 as the adjustable hitch assembly 100. The assembly 100 includes an elongated housing 102, a hitch bar 104, and a carriage member 106 with an attached hitch ball 110. A side view of this embodiment, with a section removed from the housing 102, is shown in FIG. 10 and FIG. 11 shows an exploded perspective of this embodiment. Referring to FIGS. 9 through 11, the assembly 100 includes a threaded shaft 122 which resides within the interior of the elongated housing 102 and which is turned to provide the adjustability of the assembly 100. A coupling member 128 fits within the housing 102 and contains a threaded bore 116 which receives the threaded shaft 122. A hitch bar 104 is affixed to one of the outer surfaces of the housing 102 and may include a gusset plate 132 for reinforcing the strength of the hitch bar-to-housing connection. The face of the housing which is opposite to the hitch bar 104, the housing face 118, is a relatively flat surface containing at least two parallel slots extending along the axis of the housing 102, these slots providing at least two laterally spaced locations for connection of the coupling member 128 to a carriage member 106.

The carriage member 106 connects to the coupling member 128 and includes a carriage faceplate 120 and a draw bar 124. The carriage faceplate 120 is a generally flat rectangular plate which slides along the housing face 118 when the assembly 100 is adjusted. The faceplate 120 contains several bolt holes for connection to the coupling member 128 which possesses matching threaded holes for receiving the carriage bolts 112. These holes are positioned to align with the slots 108 such that the carriage bolts 112 pass through these slots to connect the carriage member 106 to the coupling member 128. A draw bar 124, which accepts the hitch ball 110 and hitch ball nut 126, is rigidly affixed to the carriage face plate 120. Tightening carriage bolts 112 also operates to clamp carriage member 106 and coupling member 128 together. Thus, carriage bolts 112 are loosened. Next, the adjustment to position made, carriage bolts are retightened to secure the carriage member in the desired position wherein it resists movement by virtue of the clamping action.

Referring to FIG. 11, the threaded shaft 122 is supported at each of its ends by bearings or bushings 134 which capture the shaft ends and allow the shaft 122 to rotate with respect to the housing 102. The bushings 134 reside in holes within the first end plate 136 and second end plate 140. A rotatable drive element 138 is affixed to one end of the threaded shaft 122 via a press-fit pin 130. The drive element 138 includes a drive nut 114 which is configured to accept a wrench or other tool for the purpose of turning the shaft 122 and adjusting the assembly 100.

Figures 12, 13, 14:
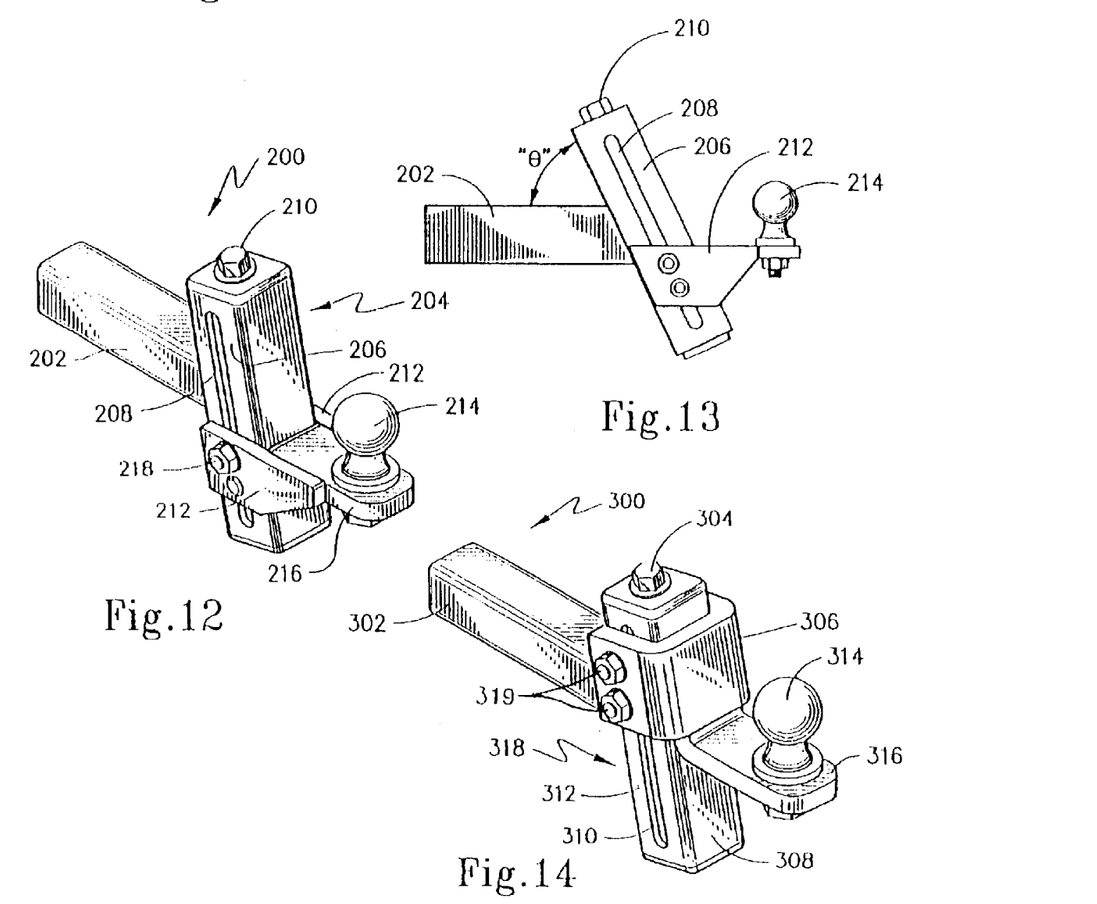
FIG. 12 is a perspective view of a third embodiment of the invention
FIG. 13 is a side view in elevation of the adjustable hitch assembly shown in FIG. 12.
FIG. 14 is a perspective view of a fourth embodiment of the invention.

A third embodiment of an adjustable hitch assembly 200 is shown in FIGS. 12 and 13, a perspective view and a side view in elevation, respectively. Referring to these figures, the assembly 200 includes a hitch bar 202, an elongated housing 204, carriage arm 212 and a draw bar 216. The elongated housing 204 contains a threaded shaft and coupling member, similar in function to the second embodiment discussed previously. Rotation of the drive nut 210 causes the threaded shaft to rotate which, in turn, causes the confined coupling member, located within the elongated housing 204, to move along the axis of the shaft. In this new embodiment, the elongated housing includes a slot on each opposite side of the housing through which the bolts 218 connect the internal coupling member to carriage arms 212. The carriage arms 212 are relatively flat plates which slide along the side faces 206 of the elongated housing 204 during any adjustment of the assembly 200. A draw bar 216 is affixed between the two carriage arms 212 and the draw bar 216 is configured to accept a conventional hitch ball 214.

As seen in FIG. 13, the hitch bar 202 is affixed to the elongated housing at an acute angle "θ". This angle may also be generally perpendicular. The holes in the carriage arms 212, through which the bolts 218 pass to connect to the coupling member, are configured to present the draw bar 216 in a plane generally parallel to the hitch bar 202. Arm 212 thus form a yoke to receive the housing. Tightening bolts 218 again serves to clamp the pieces together.

A fourth embodiment of this invention is shown in FIG. 14 as adjustable hitch assembly 300. This assembly 300 includes an elongated housing 318, a hitch bar 302, a carriage in the form of yolk 306 and a drive nut 304. A hitch bar 302 is affixed to the elongated housing 318. Similar to the third embodiment, the elongated housing 318 includes a threaded shaft affixed to the drive nut 304. Turning the drive nut 304 advances a coupling member along the threaded shaft. The yolk 306 is affixed to the coupling member through slots 310 on each side of the elongated housing 318. The carriage yolk 306 is a U-shaped piece with a tongue extending outward fashioned to be the draw bar 316 and to accept a hitch ball 314. The inner surfaces of the U-shaped yolk 306 contact the front face 308 and side faces 312 of the elongated housing 318 for support of the loads imposed on the draw bar 316. Bolts 319 connect to the coupling member (not shown) and can again clamp the unit in a desired adjustment position.

Based on the teachings of this application, one skilled in the art can see that features of the various embodiments can be interchanged to produce other variations of the embodiments. For example, similar to that discussed for the first embodiment, the hitch bar and draw bar of the other embodiments can be configured such that the hitch bar can be inserted into the hitch receiver in any one of two positions to produce a wider range of positions for the draw bar with respect to the hitch bar, once the hitch ball has been mounted in the opposing position. Also, either one of the hitch bar and the draw bar can be affixed to the housing while the other element is affixed to the carriage member, this can be seen by comparing the first embodiment (FIGS. 1 through 4) with the second embodiment (FIGS. 9 through 11). In addition, the carriage yolk in the fourth embodiment may connect with the coupling member through slots on all three sides of the housing, if desired.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

I claim:

1. A hitch assembly adapted to be secured to a trailer vehicle and a tractor trailer vehicle, comprising:
    (A) an elongated housing having an elongated, substantially enclosed interior;
    (B) a threaded shaft extending longitudinally within the interior of said housing and journaled for rotational movement therein;
    (C) a coupling member threadably received on said shaft for reciprocal longitudinal advancement in said housing when said shaft is rotated;
    (D) a rotatable drive element located exteriorly of said housing and secured to said shaft whereby rotation of said drive element acts to rotate said shaft;
    (E) a carriage member secured to said coupling member at at least two laterally spaced locations for movement therewith relative to said housing when said coupling member is longitudinally advanced therein, said carriage member located exteriorly of said housing;

(F) a first member secured to said housing and adapted to be connected to one of the tractor and trailer vehicles; and (G) a second member secured to said carriage and adapted to be connected to another one of the tractor and trailer vehicles.

2. A hitch assembly according to claim 1 wherein said shaft is constructed as a worm gear.

3. A hitch assembly according to claim 1 wherein said shaft is oriented along the central longitudinal axis of said housing.

4. A hitch assembly according to claim 1 wherein said shaft has opposite ends and including a pair of rotatable drive elements, there being one rotatable drive element at each opposite end of said shaft.

5. A hitch assembly according to claim 1 wherein said rotatable drive element is constructed as a nut adapted to be engaged by a wrench.

6. A hitch assembly according to claim 1 wherein said shaft is supported between a pair of bearing elements.

7. A hitch assembly according to claim 1 wherein said housing has a flat exterior slide face with a pair of generally parallel longitudinal slots formed therein, said carriage member connected to said coupling member by fasteners extending through the longitudinal slots.

8. A hitch assembly according to claim 7 wherein said carriage member includes a flat slide portion operative to confront the flat exterior slide face of said housing for sliding movement therealong when said coupling member is longitudinally advanced in said housing.

9. A hitch assembly according to claim 1 wherein said carriage member is configured as a sleeve.

10. A hitch assembly according to claim 9 said housing is configured as a U-shaped channel piece.

11. A hitch assembly according to claim 1 wherein said housing is square shaped in cross-section.

12. A hitch assembly according to claim 1 wherein said housing has a surrounding side wall with the interior cross-section of a selected geometry, said coupling member formed of a geometrically similar shape as the interior for close-fitted engagement therein whereby said coupling member is supported by at least a portion of said side wall during reciprocal longitudinal advancement in said housing.

13. A hitch assembly according to claim 1 wherein said first member is a hitch bar and said second member is a draw bar.

14. A hitch assembly according to claim 13 wherein said hitch bar is oriented obliquely to said housing.

15. A hitch assembly according to claim 13 wherein said hitch bar is configured to mate with a hitch receiver.

16. A hitch assembly according to claim 15 a hitch ball adapted to be releasably secured to said draw bar.

17. A hitch assembly according to claim 1 wherein said first member is draw bar and said second member is a hitch bar.

18. A hitch assembly according to claim 17 including a hitch ball adapted to be releasably secured to said draw bar.

19. A hitch assembly according to claim 17 wherein said hitch bar is configured to mate with a hitch receiver.

20. A hitch assembly according to claim 1 wherein one of said first and second members is a hitch bar and another of said first and second members is a draw bar, and including a hitch receiver adapted to secure to the tractor vehicle, said hitch bar adapted to mate with said hitch receiver.

21. A hitch assembly according to claim 20 including a hitch ball adapted to releasably secure to said draw bar.

22. A hitch assembly adapted to be secured to a trailer vehicle and a tractor vehicle, comprising:

(A) an elongated housing having an elongated interior and at least one flat exterior slide face oriented in a plane;

(B) a threaded shaft extending longitudinally within the interior of said housing and journaled for rotational movement therein, said shaft oriented in substantially parallel spaced relation to the plane of said flat exterior slide face;

(C) a coupling member threadably received on said shaft for reciprocal longitudinal advancement in said housing when said shaft is rotated;

(D) a rotatable drive element located exteriorly of said housing and secured to said shaft whereby rotation of said drive element acts to rotate said shaft;

(E) a carriage member secured to said coupling member, said carriage member including a flat slide portion operative to confront the flat exterior slide face of said housing for sliding movement therealong when said coupling member is longitudinally advanced in said housing, said carriage member being configured as a sleeve that matably receives said housing;

(F) a first member secured to said housing and adapted to be connected to one of the tractor and trailer vehicles; and (G) a second member secured to said carriage and adapted to be connected to one of the tractor and trailer vehicles, said first and second members each projecting transversely to the plane of the flat exterior face.

23. A hitch assembly according to claim 22 wherein said shaft is oriented along the central longitudinal axis of said housing.

24. A hitch assembly according to claim 22 wherein said shaft has opposite ends and including a pair of rotatable drive elements, there being one rotatable drive element at each opposite end of said shaft.

25. A hitch assembly according to claim 22 wherein said housing has a surrounding side wall with the interior cross-section of a selected geometry, said coupling member formed of a geometrically similar shape as the interior for close-fitted engagement therein whereby said coupling member is supported by at least a portion of said side wall during reciprocal longitudinal advancement in said housing.

26. A hitch assembly according to claim 22 wherein said first member is a hitch bar and said second member is a draw bar.

27. A hitch assembly according to claim 22 wherein said first member is a draw bar and said second member is a hitch bar.

28. A hitch assembly according to claim 22 wherein one of said first and second members is a hitch bar and another of said first and second members is a draw bar, and including a hitch receiver adapted to secure to the tractor vehicle, said hitch bar adapted to mate with said hitch receiver.

29. A hitch assembly according to claim 28 a hitch ball adapted to releasably secure to said draw bar.

30. A hitch assembly adapted to be secured to a trailer vehicle and a tractor trailer vehicle, comprising:

(A) an elongated housing having an elongated interior and a longitudinal dimension;

(B) a threaded shaft extending longitudinally within the interior of said housing and journaled for rotational movement therein;

(C) a coupling member threadably received on said shaft for reciprocal longitudinal advancement in said housing when said shaft is rotated;

(D) first and second rotatable drive elements each located exteriorly of said housing and respectively secured to opposite ends of said shaft whereby rotation of each said drive element acts to rotate said shaft;

(E) a carriage member secured to said coupling member for movement therewith relative to said housing when said coupling member is longitudinally advanced therein;

(F) a first member secured to said housing at an offset location relative to a center of the longitudinal dimension thereof, said first member adapted to be connected to one of the tractor and trailer vehicles; and (G) a second member secured to said carriage member and adapted to be connected to one of the tractor and trailer vehicles.

31. A hitch assembly according to claim 30 wherein said housing rounding side wall with the interior cross-section of a selected geometry, said coupling member formed of a geometrically similar shape as the interior for close-fitted engagement therein whereby said coupling member is supported by at least a portion of said side wall during reciprocal longitudinal advancement in said housing.

32. A hitch assembly according to claim 30 wherein said first member is a hitch bar and said second member is a draw bar and wherein said hitch bar is configured to mate with a hitch receiver secured to the tractor vehicle and may be selectively oriented in at least two orientations whereby in a first orientation a majority of said housing is located above said hitch bar and in a second orientation a majority of said housing is located below said hitch bar.

33. A hitch assembly according to claim 32 including a hitch ball adapted to be releasably secured to said draw bar.

34. A hitch assembly according to claim 30 wherein said first member is a draw bar and said second member is a hitch bar and wherein said hitch bar is configured to mate with a hitch receiver secured to the tractor vehicle and may be selectively oriented in at least two orientations whereby in a first orientation a majority of said housing is located above said draw bar and in a second orientation a majority of said housing is located below said draw bar.

35. A hitch assembly according to claim 30 wherein one of said first and second members is a hitch bar and another of said first and second members is a draw bar, and including a hitch receiver adapted to secure to the tractor vehicle, said hitch bar adapted to mate with said hitch receiver.

36. A hitch assembly according to claim 35 a hitch ball adapted to releasably secure to said draw bar.

37. A hitch assembly adapted to be secured to a trailer vehicle and a tractor trailer vehicle, comprising:

(A) an elongated housing having an elongated interior and a pair of oppositely facing slide faces;

(B) a threaded shaft extending longitudinally within the interior of said housing and journaled for rotational movement therein;

(C) a coupling member threadably received on said shaft for reciprocal longitudinal advancement in said housing when said shaft is rotated, said coupling member configured as a yoke including arm portions each defining a flat slide portion operative to confront the slide face of a respective one of the slide faces for sliding movement therealong when said coupling member is longitudinally advanced in said housing;

(D) a rotatable drive element located exteriorly of said housing and secured to said shaft whereby rotation of said drive element acts to rotate said shaft;

(E) a carriage member secured to said coupling member at at least two laterally spaced locations for movement therewith relative to said housing when said coupling member is longitudinally advanced therein, said carriage member located exteriorly of said housing;

(F) a first member secured to said housing and adapted to be connected to one of the tractor and trailer vehicles; and (G) a second member secured to said carriage and adapted to be connected to another one of the tractor and trailer vehicles.

38. A hitch assembly according to claim 37 wherein each slide face has a longitudinally extending slot formed therein, each said arm portion of said yoke connected to said coupling member by a fastener extending through the slot in a respective slide face.

39. A hitch assembly adapted to be secured to a trailer vehicle and a tractor trailer vehicle, comprising:

(A) an elongated housing having an elongated interior and a longitudinal dimension;

(B) a threaded shaft extending longitudinally within the interior of said housing and journaled for rotational movement therein;

(C) a coupling member threadably received on said shaft for reciprocal longitudinal advancement in said housing when said shaft is rotated;

(D) first and second rotatable drive elements each located exteriorly of said housing and respectively secured to opposite ends of said shaft whereby rotation of each said drive element acts to rotate said shaft;

(E) a carriage member secured to said coupling member for movement therewith relative to said housing when said coupling member is longitudinally advanced therein, said carriage member being configured as a sleeve that matably receives said housing;

(F) a first member secured to said housing at an offset location relative to a center of the longitudinal dimension thereof, said first member adapted to be connected to one of the tractor and trailer vehicles; and (H) a second member secured to said carriage member and adapted to be connected to one of the tractor and trailer vehicles.

* * * * *